Aug. 2, 1966  L. R. STOLLE  3,264,613
ALARM ANNUNCIATOR

Filed Oct. 13, 1961  2 Sheets-Sheet 1

Leslie R. Stolle
INVENTOR.

BY
ATTORNEY

Leslie R. Stolle
INVENTOR.

United States Patent Office 3,264,613
Patented August 2, 1966

3,264,613
ALARM ANNUNCIATOR
Leslie R. Stolle, Houston, Tex., assignor to Austin
Electronics Corporation, a corporation of Texas
Filed Oct. 13, 1961, Ser. No. 144,865
12 Claims. (Cl. 340—147)

This invention relates to alarm annunciators which are used to monitor industrial equipment, as for example to signal an alarm upon malfunctioning of such equipment.

It is well known in industry, particularly in automatic operations, to monitor various telltale characteristics of equipment or of processes so that when a certain characteristic of the equipment or process varies from a predetermined safe range, an alarm will be sounded and the equipment shut down in order to forestall damage to the equipment. For example, in a large industrial gas engine installation, the engine may be automatically shut down upon the occurrence of any of the following:

(a) Low lubricating oil level;
 (b) Low lubricating oil pressure;
 (c) Low fuel pressure;
 (d) High lubricating oil temperature;
 (e) Low jacket water pressure;
 (f) High exhaust temperature;
 (g) Excess vibration.

If, for example, an engine thusly equipped develops valve trouble the exhaust temperature may build up so that the equipment monitoring this characteristic shuts down the engine, thereby preventing irreparable damage to the engine. In systems previously used, which are provided with indicator lights or other signals which are actuated by the monitoring equipment, such an indicator light would be energized so that the maintenance crew, upon inspecting the engine, could see that the shutdown was caused by high exhaust temperature, and could readily go to the origin of the trouble and correct it. However, it will be apparent that as soon as the monitoring equipment causes the shutdown and the engine speed drops, the engine-driven pumps for oil and water would slow down and the lubricating oil pressure and jacket water pressure would drop, thereby causing the monitoring equipment to actuate signals indicating there was a failure related to these characteristics. Then when the maintenance crew goes to repair the engine, they will find several signals actuated, so that they have great difficulty in ascertaining the actual failure which initially caused the engine to be shut down. The maintenance crew may then have to spend several times as long as necessary to find and repair this actual failure.

According to the present invention, means are provided whereby the initial signal from a characteristic which varies from the safe range not only produces a signal to notify the operator or maintenance crew where the damage is, and shuts down the equipment to prevent damage to it, but also locks out any subsequent signals, so that no matter what the effect of the shutdown, only the initial failure produces a signal. The operator or maintenance crew may then determine immediately the cause of the shutdown.

The structure provided by this invention includes unique circuitry by which a signal from a monitor check point is used to energize a light or other indicator which points out the source of the signal, and positively prevents the energizing of any further light or indicator until the apparatus is reset. This is accomplished by circuitry which includes a novel memory and lockout circuit which is responsive to binary digits. The binary digits result from an encoding portion which initiates the overall circuitry. More broadly, the circuitry of this invention includes a plurality of information paths, each of which has an input conductor and an output conductor. A lockout circuit is connected to produce a locking signal upon input of information to one or more of the information paths. The lockout circuit feeds the lockout signal back into the inputs of each of the paths, thereby locking out the receipt and transmission by the paths of any further information. In a preferred embodiment of the invention, means are also provided for locking into each path the information received and transmitted by it.

For a full understanding of the invention, reference should be made to the accompanying drawings, wherein FIGURE 1 is a diagram of a preferred embodiment of the circuitry of this invention, wherein portions are shown schematically:

Figure 1:
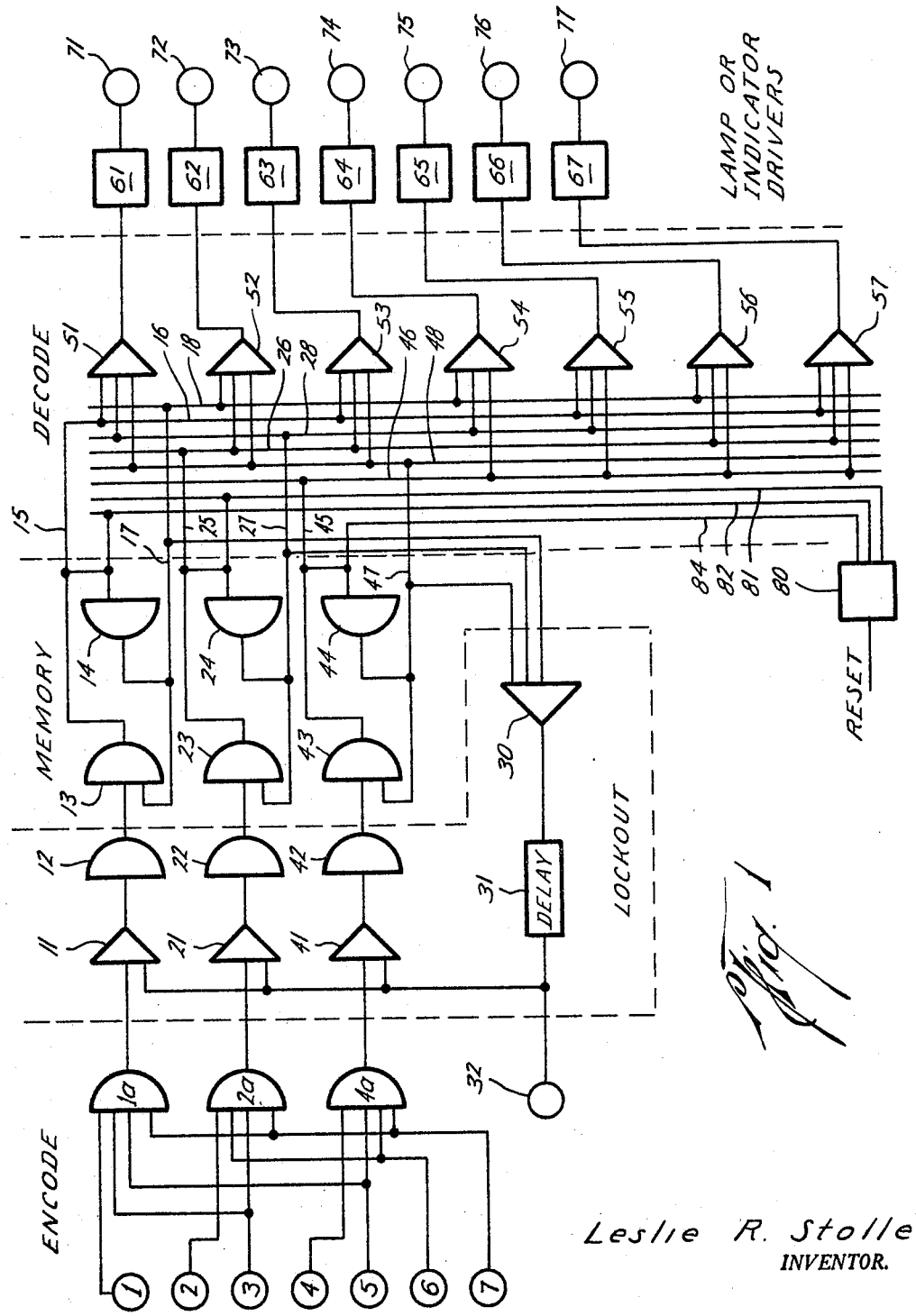

In FIGURE 1, elements 1, 2, 3, 4, 5, 6 and 7 are sources of signals which are produced by monitoring equipment which monitors characteristics of equipment or of a process. The circuitry includes an encode portion having three OR inverters or NOR circuits 1a, 2a and 4a, having binary values of 1, 2 and 4 respectively, to which the sources 1–7 are connected. The construction and functioning of a NOR circuit are well known in the art, and need not be described in detail here. Signal source 1 is connected only to NOR circuit 1a, signal source 2 is connected only to NOR circuit 2a, signal source 3 is connected to both 1a and 2a, signal source 6 is connected to 2a and 4a, and signal source 7 is connected to 1a, 2a and 4a. Thus it is seen that a digital representation of signals from any one of sources 1–7 is provided by NOR circuits 1a, 2a, and 4a. Each NOR circuit is adapted to produce a 1 output logic state whenever all input logic states to that NOR circuit are 0, and to produce a 0 output state whenever any input state to that NOR circuit is 1. Thus where the normal signal state received from sources 1–7 is 0, the output states from the NOR circuits are normally 1, but upon the occurrence of a deviation which causes the monitoring equipment to transmit a signal having a state of 1 to one or more of the NOR circuits, the output state of any NOR circuit to which a 1 signal is transmitted changes to 0.

Each OR inverter 1a, 2a and 4a feeds information to a separate information path. The information path to which information from OR inverter 1a is fed comprises an OR gate 11, followed by a first inverter 12, a second NOR circuit 13, and a second inverter 14. The information path to which information from NOR circuit 2a is fed comprises an OR gate 21, a first inverter 22, a second NOR circuit 23, and a second inverter 24. The information path to which information from NOR circuit 4a is fed comprises an OR gate 41, a first inverter 42, a second NOR circuit 43, and a second inverter 44.

Information from OR gate 11 is fed in turn to inverter 12, NOR circuit 13, and inverter 14. Information including a locking signal is fed from inverter 14 into NOR circuit 13, and is also fed to a lockout actuating OR gate 30. Similarly, information from OR gates 21 and 41 are fed to the corresponding inverters and NOR circuits, and information from inverters 24 and 44 is fed into OR gate 30. The locking signal from OR gate 30 is fed through a time delay 31 to a signalling device or shutdown actuating device 32, and is also fed into each of the OR gates 11, 21 and 41.

OR gates are well known in the art, so that no detailed description of their structure and functions is necessary here. It is sufficient to say that when any input pulse having a state of 1 is fed into an OR gate, the output therefrom has a state of 1, and when all the input pulses to the OR gate have states of 0, the output therefrom has a state of 0. As is also well known, an inverter merely inverts the pulse, changing 0 to 1 and 1 to 0. It will be evident that the combination of OR gate 11 and inverter 12 (and similarly OR gate 21 and inverter 22 and OR gate 41 and inverter 42) actually comprises another NOR circuit, but it has been found that the arrangement just described can be made and maintained more economically.

Proceeding now to the decode portion of the circuit shown in FIGURE 1, means are here provided for converting the binary digital representations to decimal representations. A conductor 15 from the output of NOR circuit 13 leads to a conductor 16, while a conductor 17 carries information from the output of inverter 14 to a conductor 18. Similarly, a conductor 25 carries information from the output of NOR circuit 23 to a conductor 26, a conductor 27 carries information from the output of inverter 24 to a conductor 28, a conductor 45 carries information from the output of NOR circuit 43 to a conductor 46, and a conductor 47 carries information from the output of inverter 44 to a conductor 48.

Seven OR gates, or a number equal to the number of original sources of information, are provided as channels for the decoded information. OR gate 51 receives information from conductors 16, 28 and 48; OR gate 52 receives information from conductors 18, 26 and 48; OR gate 53 receives information from conductors 16, 26 and 48, etc. Each OR gate 51–57 feeds information to a signal responsive lamp or indicator driver 61–67, respectively, and each such indicator driver causes an indication to appear on an indicator 71–77, respectively.

Reset apparatus 80, as is well known in the art, is provided for resetting the entire circuit in its original condition after one or more information bits have passed through and have been stored in the circuitry. Three leads 81, 82, 84 lead to the inputs to inverters 14, 24, 44 respectively for this purpose.

Figure 2:
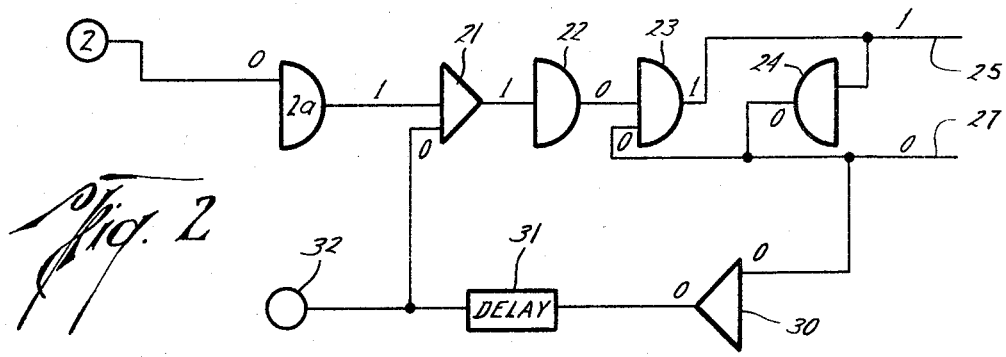
FIGURE 2 is a diagram of a portion of the circuitry shown in FIGURE 1 marked to show the binary value of the signal pulse in each stage of the circuit while no alarm signal is being fed into the circuit.
Figure 3:
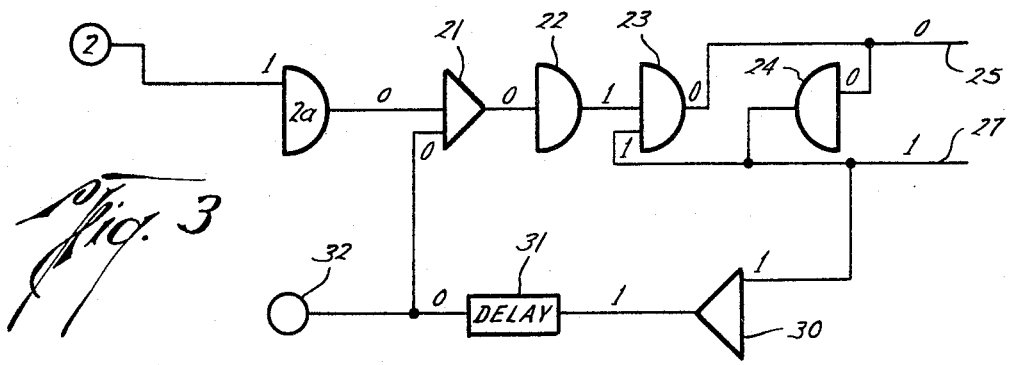
FIGURE 3 is a diagram of the circuit portion shown in FIGURE 2 marked to show the binary value of the signal pulse in each stage of the circuit at the instant an alarm signal is fed into the circuit.
Figure 4:
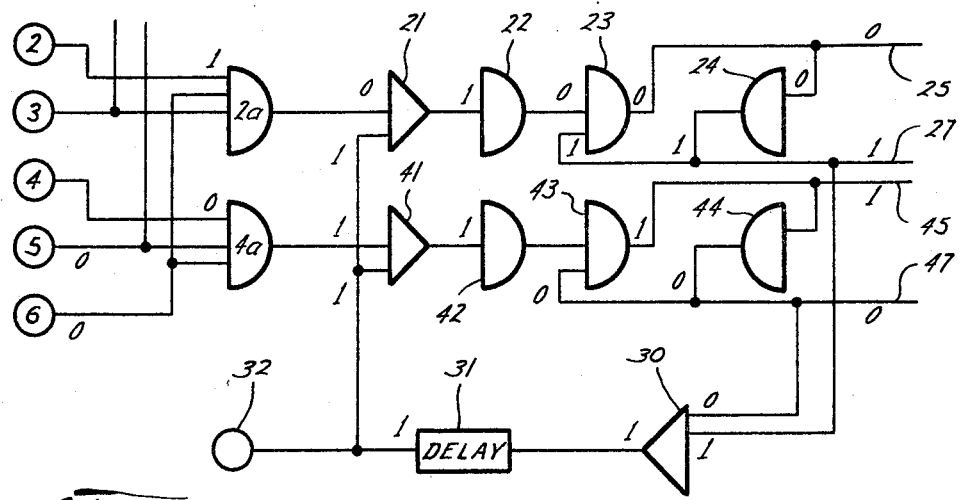
FIGURE 4 is a diagram of the circuit portion shown in FIGURE 3 marked to show the binary value of the signal pulse in each stage of the circuit immediately after the condition shown in FIGURE 3.

The operation of the circuitry described hereinbefore and shown in FIGURE 1 will be more readily understood by reference to FIGURES 2, 3 and 4 which show one of the information paths marked to show the state of the signal at each stage of the path under the four possible conditions of the circuit. FIGURE 2 shows the condition which exists when no alarm has been received from any of the sources which feed information to NOR circuit 2a, so that the state of each of the pulses feeding into NOR circuit 2a is 0. The output from NOR circuit 2a therefore has a state of 1, and the output from OR gate 21 is also 1. This information is fed to inverter 22, where it is changed to 0 for feeding to NOR circuit 23. NOR circuit 23 changes the pulse to 1 for feeding to inverter 24 and to conductor 25. Inverter 24 responds with a 0 output, which is fed back into NOR circuit 23. Since NOR circuit 23 still has no 1 input, its output remains 1. The 0 output information from inverter 24 is also fed to OR gate 30. If no pulse having a state of 1 is being fed to OR gate 30, the output from this OR gate is 0, and this 0 output information is fed through the time delay 31 to the signalling or shutdown actuating device 32 and to the input of each of OR gates 11, 21 and 41. The signalling or shutdown actuating device is actuated only by a 1 signal, so the 0 signal does not affect it. Furthermore, the 0 signal does not affect the output of any of the OR gates 11, 21, or 41, since the output of these circuits is modified only by 1 signals.

FIGURE 3 is marked to show the momentary condition of the circuit portion shown in FIGURE 2 for a short period of time when an alarm has been received from source 2 or one of the other sources which feed information to NOR circuit 2a, before the time delay period imposed by time delay 31 is exceeded. It is apparent that, since an alarm is indicated at the input of NOR circuit 2a as a signal pulse having a state of 1, the signal pulse at each stage of the circuit portion shown has a state opposite that shown in FIGURE 1, down to the time delay. Thus a signal pulse having a state of 1, referred to herein as a "locking signal," is fed from OR gate 30 to the time delay 31. Since the locking signal is momentarily held up at this point, there is still a 0 signal between the time delay and OR gates 11, 21 and 41.

As soon as the time delay releases the locking signal, however, the condition changes. A 1 signal to a signalling or shutdown actuating device 32 actuates this device, and a 1 signal to OR gate 21 changes the output of this circuit from 0 to 1. The effect of this is shown in FIGURE 4, where the information path fed by NOR circuit 4a has been included to show the effect of the release of the momentarily stored 1 signal upon this information path.

It is apparent that the effect of feeding the momentarily stored 1 signal to OR gate 21 is to change the output of this OR gate from 0 to 1, and thereby to change the output of inverter 22 from 1 to 0. However, the output of NOR circuit 23 is not changed, since it is already "locked in" by the 1 signal from inverter 24. Thus a 0 signal is supplied to conductor 25 and a 1 signal is supplied to conductor 27. This is of course the opposite of the condition shown in FIGURE 2.

On the other hand, the above described effect is not obtained by the feeding of the momentarily stored 1 signal to OR gate 41. Since NOR circuit 4a has not been given a 1 pulse from any source, its output is 1, and, until the release of the momentarily stored information, the condition of its information path was the same as was shown for the 2a circuit portion in FIGURE 2. It is apparent, however, that the release of the 1 signal by the time delay does not affect the condition of this portion of the circuit. Whether a single 1 pulse or parallel 1 pulses are fed to OR gate 41, the output is still 1. Thus the state of the signal pulse fed to conductor 45 is still 1, and that fed to conductor 47 is still 0.

It will therefore be evident that if the only alarm signal fed into the circuitry shown in FIGURE 1 is from source 2, the state of the pulses fed to the conductors leading to the decode section of the circuitry will be 1 for conductors 15, 27, and 45, and 0 for conductors 17, 25, and 47. Thus the state of the information in the decode section conductors will be 1 for conductors 16, 28, and 46, and 0 for conductors 18, 26, and 48. Since OR gate 51 is fed information from conductors 16, 28, and 48, a 1 signal is being fed to this OR gate, and therefore its output is 1. OR gate 52 is fed information from conductors 18, 26, and 48, all of which, for the condition stated, have a state of 0, so that the output from OR gate 52 is 0. Since at least one 1 signal is being fed to each of the other OR gates 53–57, each of these has a 1 output. The drivers 61–67 are such that they are actuated only by a 0 signal, therefore only driver 62 is actuated, and only indicator 72 indicates a signal.

Now let us consider what happens if, a few seconds later, another alarm signal is fed into the circuit by, for example, source 6. This would mean that a pulse having a state of 1 is fed into NOR circuits 2a and 4a. NOR circuit 2a already has a 1 pulse feeding into it, so its output is not affected. NOR circuit 4a has previously been fed only a 0 pulse, so its output is changed to 1. However, OR gate 41 already has a 1 pulse feeding into it and therefore already has a 1 output, so the additional 1 pulse will not affect its output. Thus the second alarm signal has absolutely no effect upon the pulse states fed to the decode section of the circuitry, so that only indicator 72 is actuated.

It is therefore apparent that means are provided by this invention for providing an identification of the first signal from a plurality of sources of signals, while effectively locking out any further signal from one of such sources. The circuitry shown is useful for up to seven sources of signals, but it will be apparent that the addition of another NOR circuit having a binary value of 8 in the encode section, with a corresponding information path and decoding elements, would increase the capacity of the system so that it could handle fifteen sources.

When an alarm signal is fed into the circuitry, the shutdown device 32 is actuated, and one of the indicators 71–77 is actuated, as has previously been described. The operator ascertains the origin of the alarm and, when the equipment is repaired, restarts the equipment. He then may reset the device of this invention so that it is ready to again distinguish an alarm signal source, by actuating the reset 80. Conductors 81, 82 and 84 leading to inverters 14, 24, and 44 respectively, conduct a signal to these inverters which causes these elements to return to their original condition, and therefore brings each of the information paths back to the condition shown in FIGURE 1.

Time delay 31 has ben described as causing a momentary delay in the transmission of information from OR gate 30. This delay need be only sufficient to insure that the 1 pulse fed into NOR circuit 23 from inverter 24, as shown in FIGURE 3, for example, has had time to impose itself on NOR circuit 23 before the 0 pulse generated by the locking signal reaches NOR circuit 23, since otherwise the output of NOR circuit 23 might be erratic. This delay need not be more than two or three microseconds, and, as a matter of practice, will often be provided by the longer path that the locking signal from OR gate 30 must pass through before reaching NOR circuit 23, so that the time delay 31 may sometimes be dispensed with. The maximum length of the delay depends upon the expected time between an initial and a subsequent alarm signal, and therefore depends upon the type of equipment being monitored.

Although a specific embodiment of the invention has been shown and described herein, many modifications thereof will be apparent to those skilled in the art, therefore the invention is not limited to the specific embodiment, but only as set forth by the following claims.

What is claimed is:

1. Circuitry comprising
   a plurality of information paths adapted to receive and transmit information signals, each said information path comprising, directly connected in series, a NOR circuit, a first OR gate, a first inverter, a second NOR circuit, a second inverter, and means for feeding output signals from the second inverter into the input of the second NOR circuit;
   an OR gate external of said information paths;
   means for feeding output signals from the second inverter of each information path into the input of the external OR gate;
   and means for feeding the output of the external OR gate into the input of each of the first OR gates in the information paths to prevent the transmission of any further information signal through any of the information paths.

2. Apparatus as defined by claim 1, including means for delaying the feeding of the output of the said external OR gate into the input of the first OR gates in the information paths.

3. Apparatus for providing an identification of the first signal from a plurality of sources of signals comprising
   means for creating binary digital representations of signals from said sources;
   a plurality of information paths adapted to receive and transmit said binary digital representations, each said information path comprising, directly connected in series, a NOR circuit, a first OR gate, a first inverter, a second NOR circuit, a second inverter and means for feeding output signals from the second inverter into the input of the second NOR circuit;
   an OR gate external of said information paths;
   means for feeding output signals from the second inverter of each information path into the input of the external OR gate;
   and means for feeding the output of the external OR gate into the input of each of the first OR gates in the information paths to prevent transmission of any further information signal through any of the information paths.

4. Apparatus as defined by claim 3 wherein the last-named means includes a time delay.

5. Apparatus for providing an identification of the first signal from a plurality of sources of signals comprising means for creating binary digital representations of signals from said sources; a plurality of information paths adapted to receive and transmit said binary digital representations, each said information path comprising in series a NOR circuit, a first OR gate, a first inverter, a second NOR circuit, and a second inverter, and means for feeding output signals from the second inverter into the input of the second NOR circuit; an OR gate external of said information paths; means for feeding output signals from the second inverter of each information path into the input of the external OR gate; means for feeding the output of the external OR gate into the input of each of the OR gates in the information paths; a first information path output conductor leading from each of said second NOR circuits; a second information path output conductor leading from each of said second inverters; decoding means connected to receive digital representations from said first and second output conductors and to convert such digital representations into actuating signals representative of said sources and identifying said first signal; and indicator means adapted to be actuated by said actuating signals to indicate the source of said first signal.

6. Apparatus for providing an identification of the source of the first signal from a plurality of possible sources comprising
   a plurality of information paths of lesser number than the number of sources, each adapted to receive information from at least one of said sources,
   source identification means for each source connected to said information paths in such a manner as to indicate the transmission of information resulting from a signal from such source,
   a lockout circuit connected to all of said paths adapted to produce a locking signal upon receipt and transmission of information by at least one of said paths, and
   means for feeding the locking signal back into all of the information paths to prevent the transmission by the paths of any further information.

7. Apparatus as defined by claim 6 and including memory means in each information path adapted to maintain said indication on said source identification means after the transmission of information has ceased.

8. Apparatus for providing an identification of the source of the first signal from a plurality of possible sources, which comprises
   an encoding portion adapted to produce binary digits representative of the source of a signal,
   a memory portion adapted to receive and remember said binary digits,
   a decoding portion adapted to receive said binary digits and convert them to a signal representative of said source, and
   a locking portion adapted to be actuated upon the receipt of a signal from any source to lock the digits representative of said source in the memory portion and to prevent the receipt by the memory portion of any other signal.

9. Apparatus for providing an identification of the source of the first signal from a plurality of possible sources comprising
a plurality of information paths of lesser number than the number of sources, each path adapted to receive information from at least one of said sources,
a source identification means for each source connected to said information paths in such a manner as to indicate the transmission of information resulting from a signal from such source,
a lockout circuit connected to all of said paths adapted to produce a locking signal upon receipt and transmission of information by at least one of said paths, and
means for feeding the locking signal back into all of the information paths to prevent the transmission by the paths of any further information.

10. Apparatus comprising
a plurality of signal sources,
a plurality of information paths, lesser in number than the number of signal sources,
encoding circuitry leading to said information paths adapted to conduct a signal from any of said sources to a combination of said information paths indicative of the source of the signal,
a plurality of indicators equal in number to the number of sources,
decoding circuitry connected to said information paths adapted to conduct a signal from said combination of information paths to an indicator corresponding to the signal-emitting source, and
a locking circuit actuable in response to the receipt of a signal by a combination of information paths to produce a locking signal to prevent the transmission of a further signal by any information path.

11. Circuitry comprising
a plurality of information paths, each of which comprises, in series,
a first NOR circuit to receive a signal of one state and produce a signal of the opposite state,
a second NOR circuit connected to receive said produced signal,
a third NOR circuit connected to receive the output of the second NOR circuit,
an inverter connected to receive the output of the third NOR circuit and produce a signal of the opposite state, and
means for feeding the inverter output into the third NOR circuit to lock it to maintain the state of its ouput signal when a signal is being received by the first NOR circuit,
an OR gate,
means for feeding into the input of the OR gate the output signals from the said inverter of each information path,
means for feeding the output of the OR gate into the input of the second NOR circuit of each information path to lock them to prevent a change in the output state of each information path,
indicator means, and
means for conducting the output of each information path to said indicator means.

12. Apparatus for providing an identification of the first signal from a plurality of sources of signals which comprises
a plurality of information paths, lesser in number than the number of sources,
encoding means for directing the first signal to a combination of information paths indicative of the source of the first signal,
an indicator for each source,
decoding means for directing the outputs of said combination of information paths to energize the indicator for the source of said first signal, and
lockout means actuable in response to said first signal to prevent signals from other sources from energizing said indicators.

References Cited by the Examiner
UNITED STATES PATENTS

| Re. 24,641 | 5/1957 | Raynolds | 340—147 |
| 2,888,556 | 5/1959 | Richards | 328—49 |
| 2,972,718 | 2/1961 | Alperin et al. | 340—168 |
| 3,025,498 | 3/1962 | Blodgett | 340—147 |
| 3,193,814 | 7/1965 | Foster | 340—223 |

References Cited by the Applicant
UNITED STATES PATENTS

| Re. 24,031 | 6/1955 | Marmorstone. |
| Re. 25,214 | 7/1962 | Tellefsen et al. |
| 3,029,021 | 4/1962 | Beguin. |

FOREIGN PATENTS 713,631    8/1954    Great Britain.

NEIL C. READ, *Primary Examiner.*

L. HOFFMAN, A. KASPER, *Assistant Examiners.*